April 12, 1927.

A. L. ROMERO 1,624,149

LANTERNS CALLED PERSONAL CHARACTER READERS

Filed June 19, 1925

F-12. TRUTHFUL, EXECUTIVE, PROPHETIC, SUCCESSFUL IN MONEY MATTERS, FINE HOUSE-KEEPERS, EXCELLENT WIVES.

F-12: QUICK TEMPER, COMBATIVENESS, NOT CAREFUL OF HEALTH.

F. 12. CULTIVATE CALMNESS CONTROL SELF. FOLLOW OWN INTUITION PATIENTLY.

INVENTOR:
Alfredo L. Romero
ALFREDO L. ROMERO.

Patented Apr. 12, 1927.

1,624,149

UNITED STATES PATENT OFFICE.

ALFREDO L. ROMERO, OF SAN FRANCISCO, CALIFORNIA.

LANTERNS CALLED PERSONAL CHARACTER READERS.

Application filed June 19, 1925. Serial No. 38,234.

The invention relates to providing personal character readings to common lanterns having the form of stars, so that when one desires to know for what purpose he was born into this world, he just can buy a personal character-reader star lantern that appertains to the month during which he was born, and in said lantern he can read the faculties, talents, etc., with due advice how to defeat the weakness of his character. Indeed, altho this invention is merely for curiosity, but it will help some to have inspiration and thus do their utmost to persuade themselves to betterment, and when so done, this world will have more better citizens. The objects of the invention therefore, are first, to provide personal character readings of human beings to lanterns having the form of a star, decorating said stars with colors that appertain to each of them, according to books on zodiacs; and second, to provide with luminous paint to said stars which may be painted or applied in part or in full of their faces, to make them luminous and twinkle at night, like real stars.

Figure 1:
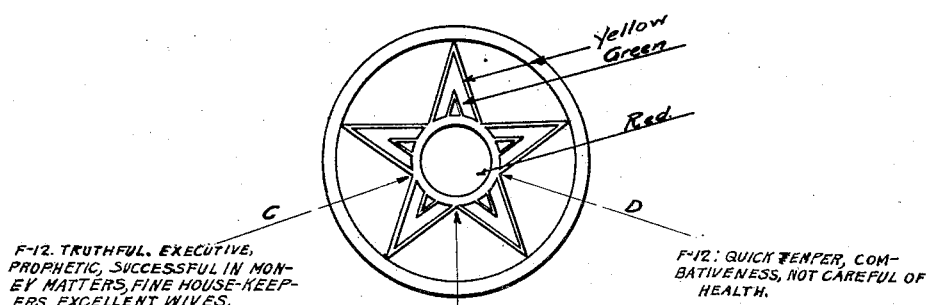
Fig. 1 shows the plan of a common star lantern to which are provided the personal character readings of women born during the month of December.
Figure 2:
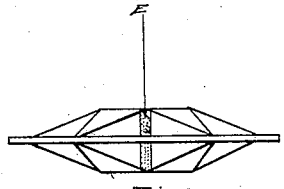
Fig. 2 shows the bottom view of the same common star lantern.

Figs. 1 and 2, exhibit a common lantern having the form of a star. The lanterns are 24 in number and varieties—two lanterns correspond to each month of the year, one of the lanterns describes the personal characteristics of men born during the month, and the other, describing the characteristics of that of women born also during the month. The personal character readings are labeled or printed to any convenient part or parts on the lanterns, preferably at their sides, as shown by arrows 'A and B,' Figs. 1 and 2. The personal character readings and the colors to decorate each lantern are all taken from books on zodiacs. The characteristics given in the drawing are for women born during the month of December, marked F-12 (F, means female; and 12, corresponds to the month of December). The colors used to decorate this lantern, are thus, red, green and yellow; which colors are the colors suggested by nature for the women born in December to use in their garments. Lanterns which are for men are marked 'M' then followed by the number of the month of the year; and lanterns which are intended for women, are marked 'F' then followed by the number of the month of the year.

The personal character-reader lanterns having the form of a star, may be painted with luminous paint to make them visible at night, which paint may be applied to said lanterns in part or in full of their surfaces.

Since the invention is just the provision of printed matter, as stated before, to common lanterns having the form of a star, the inventor does not furnish the Patent Office with the construction of such lanterns, as he deems that they are common star lanterns, like Japanese lanterns, and consequently not his invention.

Figure 3:
Fig. 3 shows a coil spring which may be placed within the body of the star lanterns to make them collapsible as a convenience in handling.

The spring shown in Fig. 3 may be provided within the body of the star lantern so that the same may be collapsed in the direction of the arrows "A" and "B", as a convenience in transportation.

Having described and illustrated the main features of the invention, what I claim is:

1. In personal character-reader star lanterns, twenty-four or so in number and varieties—provided with personal character readings of human beings, with the ideal colors for them to wear, as per books on zodiacs, said personal character-reader star lanterns are divided into twelve months of the year, each lantern to correspond to each sex of the human beings for each month of the year.

2. In personal character-reader star lanterns having the characteristics mentioned in claim 1 above, painted with luminous paint in part or in full of their surfaces, to make them luminous or visible at night.

In testimony whereof, I affix my signature.

ALFREDO L. ROMERO.